Feb. 16, 1965     B. J. OTTEN     3,170,028
ADJUSTABLE ELECTRICAL BOX AND PLATE
Filed Dec. 24, 1962     2 Sheets-Sheet 1

BERNARD J. OTTEN.
*INVENTOR.*

Feb. 16, 1965 B. J. OTTEN 3,170,028
ADJUSTABLE ELECTRICAL BOX AND PLATE
Filed Dec. 24, 1962 2 Sheets-Sheet 2

BERNARD J. OTTEN.

INVENTOR.

3,170,028
ADJUSTABLE ELECTRICAL BOX AND PLATE
Bernard J. Otten, La Mesa, Calif.
(14212 Red Hill Ave., Santa Ana, Calif.)
Filed Dec. 24, 1962, Ser. No. 246,831
8 Claims. (Cl. 174—58)

This invention relates to a new mounting plate-electrical switch, outlet, or junction box combination for use in new or existing structures, the principle features of this new device being provisions for simplifying the task of installing the box in existing structures and provisions for adjusting the depth of the box relative to the finished surface of the wall within which the box is installed.

Heretofore electrical switch, outlet, or junction boxes have been designed primarily for installation in new construction where the boxes are installed prior to installation of the wall surfacing material and where there is sufficient working room; therefore, existing boxes do not incorporate adequate features to compensate for the limited working area encountered when installing a box in an existing structure.

A primary object of the present invention is to provide a means by which an electrical switch, outlet, or junction box can be installed in existing structures with greater ease than is possible with presently available boxes.

Another object of the present invention is to provide a means by which an electrical switch, outlet, or junction box can be adjusted on a mounting plate so that the depth of the box relative to the finished wall surface can be varied.

A further object of the present invention is to provide a means by which an electrical switch, outlet, or junction box can be readily removed from a mounting plate within a wall and another box serving a similar or different purpose can be mounted on the same plate thereby providing a degree of interchangeability and flexibility not presently available.

A still further object of the present invention is to provide a means by which existing electrical switch, outlet, or junction boxes can, by minor modification to the boxes, be more readily mounted in existing structures.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 9:
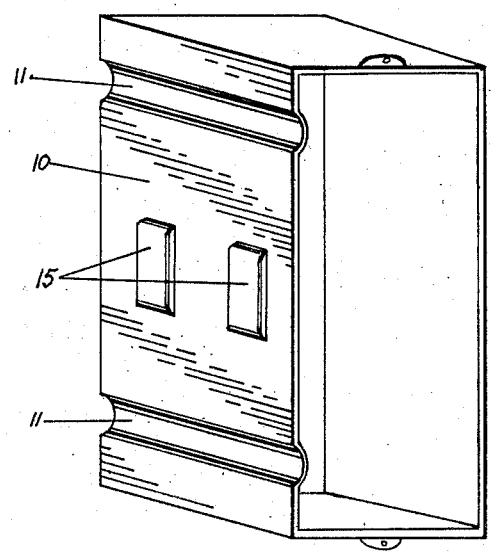
FIGURE 9 is an alternate embodiment of the box portion of the invention showing provisions for the attachment of the box to the mounting plate of FIGURE 7.
Figure 10:
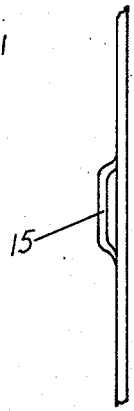

FIGURE 10 presents another view of the attachment provisions shown in FIGURE 9.

Figure 1:
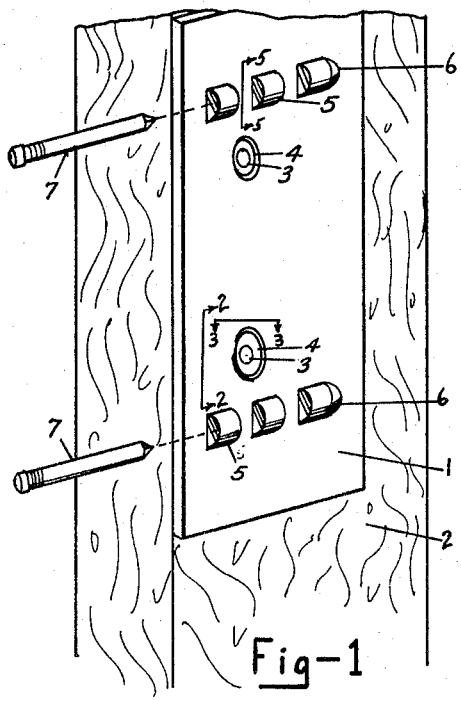
FIGURE 1 is a perspective view, partially exploded, of the mounting plate shown attached to a wall structural member.

Referring now to FIGURE 1 of the drawings, 1 is a mounting plate attached to a structural member 2, within a wall, by means of nails or screws passing through holes 3 in raised surfaces 4 of the mounting plate. The raised surfaces 4 of the mounting plate are provided in such a manner that the top face of each raised surface is at an angle to the surface of the mounting plate. The holes 3 pass through the raised surfaces 4 at right angles to the top face of each raised surface so that these holes are at an angle to the surface of the mounting plate. This angle is such that when nails or screws are inserted into the holes their heads will protrude readily through a hole cut into a wall surface for installation of an electrical switch, outlet, or junction box, thereby providing adequate room for the use of tools required to force the nails or screws into the structural wall member 2.

Referring again to FIGURE 1, 5 are portions of the mounting plate raised to form loops. These loops are in rows, the loops in each row being concentric with each other and with the closed end loop 6 at the bottom of each row. These loops are provided for the insertion of nails 7 or similar devices, which are used to secure the electrical switch, outlet, or junction box to the mounting plate. The closed end loops 6 are provided so that the ends of the nails 7 will be deflected inward into the structural member 2 or inward and between the structural member 2 and the mounting plate 1, thereby securely holding the nails in place.

Figure 2:
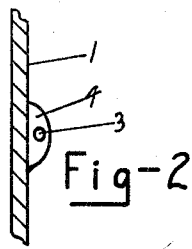
FIGURE 2 is a view, partially in cross-section, through axis 2—2 of FIGURE 1.
Figure 3:
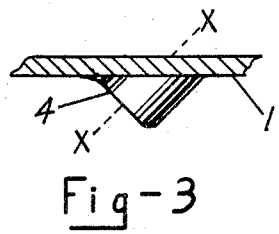
FIGURE 3 is a view, partially in cross-section, through axis 3—3 of FIGURE 1.

A raised surface 4 of the mounting plate 1 is shown for greater clarity in FIGURES 2 and 3. FIGURE 2 is a view through axis 2—2 of FIGURE 1 and shows the hole 3 in the raised surface 4, so that the hole is at an angle to the mounting plate surface. FIGURE 3 is a view of the same raised surface through axis 3—3 of FIGURE 1. In FIGURE 3 the angle of the raised surface 4 to the mounting plate surface is more apparent. The hole 3 through the raised surface 4 is along axis x—x of FIGURE 3.

Figure 4:
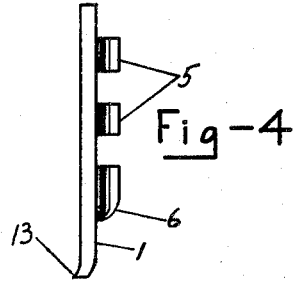
FIGURE 4 is an end view of the mounting plate shown in FIGURE 1.

FIGURE 4 is an end view of the mounting plate 1, showing a side view of the loops 5 and closed end loop 6. This figure also shows the bottom edge of the mounting plate being bent inward slightly so that a relatively sharp edge 33 is formed. When attaching the mounting plate to a structural member this edge 13 tends to dig into the member and thereby prevents the mounting plate from slipping as the mounting nails or screws are driven into the member.

Figure 5:
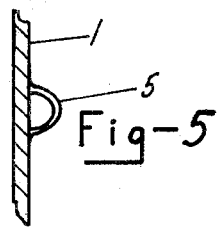
FIGURE 5 is a view, partially in cross-section, through axis 5—5 of FIGURE 1.

FIGURE 5 is a view, partially in cross-section, through axis 5—5 of FIGURE 1. This figure shows an end view of the raised loops through which the nails 7 are passed.

Figure 6:
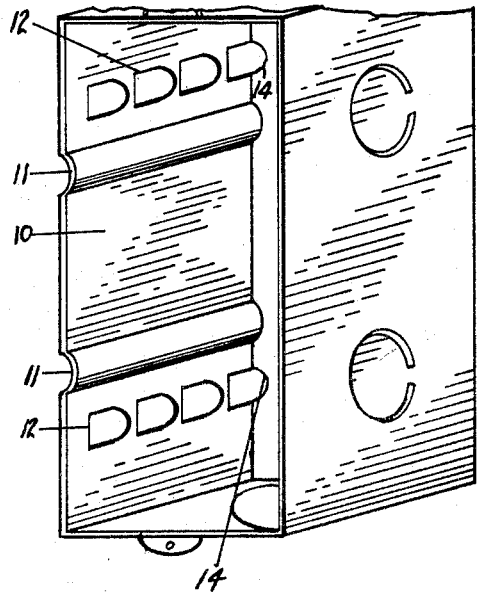
FIGURE 6 is a perspective view of an electrical switch, outlet, or junction box showing provisions for attachment of the box to the mounting plate, FIGURE 1.

FIGURE 6 shows an electrical switch, outlet, or junction box, conventional in all respects except for the bottom which has two semi-circular holes 14 on one edge, and the left side 10 of the box. Two grooves 11 are formed in the side 10 so that when the box is attached to the mounting plate of FIGURE 1 there will be no interference between the box and the raised surfaces 4 of the mounting plate. When fitted to the mounting plate 1, the holes 12 in the box side 10 mate with the loops 5 and 6 of the mounting plate so that the loops protrude into the box. The nails 7 of FIGURE 1, then are inserted through the loops 5 and 6 of FIGURE 1. When the points of the nails meet the closed ends of loops 6 the nails are driven in so that the nail ends follow the curvature of the closed end loops and either enter into the structural member 2 or wedge themselves between the mounting plate and structural member. In this manner the electrical switch, outlet, or junction box is secured to the mounting plate. If the box is to be removed, the nails 7 can be withdrawn thereby freeing the box. In this manner different boxes can be used with the same mounting plate.

Adjusting the depth of the box relative to the surface of the wall in which it is installed can be done by moving the box inward or outward within the wall as desired prior to mating the holes 12 of the box with the loops 5 and 6 of the mounting plate. The number and increments of adjustment possible will depend upon the number of loops and holes provided and the spacing between loops and between holes. The semi-circular holes 14 are provided so that there will be clearance between the bottom of the box and the mounting plate raised loops in the event that the box is so positioned on the mounting plate that the bottom of the box would interfere with any of the loops.

Figure 7:
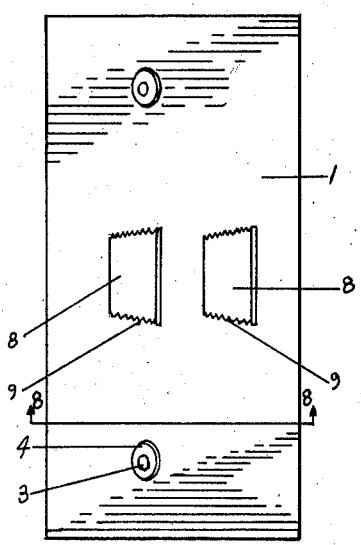
FIGURE 7 is an alternate embodiment of the mounting plate portion of the invention.
Figure 8:
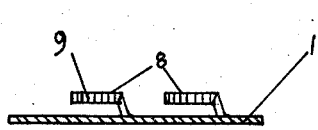
FIGURE 8 is a view, partially in cross-section, through axis 8—8 of FIGURE 7.

An alternate method of attaching the box to the mounting plate is shown in FIGURES 7 and 9. In FIGURE 7 the mounting plate is provided with raised wedges 8, the edges of which are serrated, 9. These raised wedges are shown again in FIGURE 8, a view partially in cross-section, through axis 8—8 of FIGURE 7.

In FIGURE 9 the box is shown with two sections of one wall punched outward to form two straps 15 protruding on the outside of this wall. These straps are for greater clarity again in FIGURE 10, a view looking downward at the top edge of the box wall. When attached to the mounting plate of FIGURE 7, the straps 15 of FIGURES 9 and 10 fit over the wedges 8 of FIGURE 7. The box is secured to the mounting plate by forcing the box inward so that the straps 15 of FIGURES 9 and 10 are forced over the serrated edges 9 of the raised wedges 8 of the mounting plate. The serrated edges prevent the box from loosening on the mounting plate. The serrations in combination with the taper of the wedges also provide some degree of adjustment in the depth of the box relative to the surface of the wall, this degree of adjustment depending upon the force with which the box is pushed over the serrated wedges.

The ease of installing existing electrical switch, outlet, or junction boxes in existing structures can be appreciably increased by incorporating the existing boxes the raised surfaces and the mounting hole to wall angle features of FIGURE 1 and previously explained.

The foregoing description and the accompanying drawings are considered as examples only since other designs and applications are possible. Such other designs and applications would fall within the scope of this invention as claimed.

What is now claimed as new is as follows:

1. A combination of a mounting plate and an electrical switch, outlet, or junction box, the mounting plate comprising a sheet of plastic or metallic material, rectangular in shape, the sheet supporting one or more raised surfaces, the face of each raised surface forming an obtuse angle relative to the face of the mounting plate, the face of each raised surface incorporating a hole substantially at right angles to and passing through said surface, each hole serving as a guide for a nail or screw in such a manner that the nail or screw inserted into the hole forms an acute angle relative to the face of the mounting plate, the centerline of the nail or screw being in a plane substantially parallel to the two short edges of the mounting plate and substantially at right angles to the two long edges of the mounting plate, the mounting plate thus being capable of being secured to a wall structural member by means of a nail or screw passing through the hole or holes thus provided, the mounting plate also comprising one or more rows of open-ended raised loops, the centerline of each row being substantially parallel to the two short edges of the mounting plate and being common to all loops in each row, the bottom loop in each row being closed at its bottom end, by a curved surface, this surface being convex on its outside and concave on its inside, each row of loops being so formed that it will allow a nail or similar device to be inserted through the loops until the point of the nail touches the inside, concave surface closing the bottom of the bottom loop, this concave surface then serving to guide the point of the nail outward to the underside of the mounting plate either into the wall structural member or between this member and the underside of the mounting plate, the electric switch, outlet, or junction box, of plastic or metallic material, comprising in one side wall one or more grooves, cutouts, or detents which provide clearance for the raised surfaces of the mounting plate, and one or more rows of holes which mate with the raised loops of the mounting plate, wherein the mounting plate is attached to a wall structural member by means of nails or screws passing through the holes in the mounting plate raised surfaces and thence into the wall structural member, and wherein the electrical switch, outlet, or junction box then is secured to the mounting plate by mating the box sidewall holes with the mounting plate loops and then passing a nail or similar device through the mounting plate loops so that this nail will retain the box in its attached position.

2. A combination of a mounting plate and an electrical switch, outlet, or junction box as defined in claim 1 in which one or more rows of loops are provided in the mounting plate and one or more rows of holes are provided in the sidewall of the box, and in which the number of holes in each row of holes in the box sidewall exceeds the number of raised loops in the mating row of loops on the mounting plate so that the depth of the box relative to the wall surface can be varied and controlled by moving the box inward or outward relative to the wall surface prior to mating the box sidewall holes with the mounting plate raised loops.

3. A combination of a mounting plate and an electrical swiltch, outlet, or junction box as defined in claim 1 wherein means are provided so that the box can be removed easily from the mounting plate merely by removing the nails or similar devices securing the box to the mounting plate, without removing the mounting plate from the wall structural member, and wherein a different box serving a similar or different purpose can be secured to the same mounting plate, thereby providing greater flexibility and interchangeability in the use of such boxes.

4. A combination of a mounting plate and an electrical switch, outlet, or junction box as defined in claim 1 in which the bottom edge of the mounting plate is bent slightly thereby forming a relatively sharp edge on the underside of the plate, wherein the edge thus produced serves to minimize any tendency of the plate to slip inward while being installed.

5. A combination of a mounting plate and an electrical switch, outlet, or junction box as defined in claim 1 in which means are provided whereby the nails or screws used to attach the mounting plate to a wall structural member are made more accessible for the use of the required tools in restricted work areas.

6. A combination of a mounting plate and an electrical switch, outlet, or junction box as defined in claim 1 in which the mounting plate is provided with one or more protruding wedge shaped sections, in lieu of protruding loops, the wedges being tapered toward the upper or front edge of the plate, and in which one sidewall of the box is provided with protruding straps, or slots, on its outside, in lieu of a row or rows of holes, wherein the straps or slots on the box sidewall can be pushed over the mounting plate wedges thereby securing the box to the mounting plate.

7. A combination of a mounting plate and an electrical switch, outlet, or junction box as defined in claim 2 in which the bottom of the box is provided with cutouts or knockouts directly below each row of holes in the box sidewall so that there will be clearance between the bottom of the box and the mounting plate raised loops in the event that the box is so positioned on the mounting plate that the bottom of the box would interfere with any of the loops.

8. A combination of a mounting plate and an electrical switch, outlet, or junction box as defined in claim 1 in which the box is secured to the mounting plate by means of a nail or similar device passing through raised loops in the mounting plate after the box sidewall holes have been mated with the raised loops and wherein the nail or similar device then is positively secured in place by means of a curved surface closing the bottom of the bottom loop and guiding the nail point so that it will either enter into the wall structural member or will be forced in between this member and the underside of the mounting plate.

References Cited by the Examiner

UNITED STATES PATENTS

| | | | |
|---|---|---|---|
| 691,874 | 1/02 | Robinson | 220—3.9 |
| 1,026,164 | 5/12 | Hoffman. | |
| 1,592,990 | 7/26 | Raquette et al. | 220—3.9 |
| 1,718,878 | 6/29 | Raquette | 248—223 X |
| 1,751,691 | 3/30 | Flath | 248—223 X |
| 1,820,824 | 8/31 | Phiffer | 174—58 X |
| 2,076,650 | 4/37 | Kettron | 174—49 |
| 2,309,189 | 1/43 | Hancock et al. | 220—3.7 |
| 2,406,587 | 8/46 | Cooper | 220—3.9 |
| 2,879,912 | 3/59 | Appleton | 220—3.9 |
| 2,917,199 | 12/59 | Appleton | 220—3.7 |
| 2,952,343 | 9/60 | Modrey | 248—223 X |

OTHER REFERENCES

German printed application, 1,079,715 4/60.

DARRELL L. CLAY, *Primary Examiner.*

JOHN P. WILDMAN, JOHN F. BURNS, LARAMIE E. ASKIN, *Examiners.*